United States Patent [19]

Hong et al.

[11] Patent Number: 4,539,549
[45] Date of Patent: Sep. 3, 1985

[54] METHOD AND APPARATUS FOR DETERMINING MINIMUM/MAXIMUM OF MULTIPLE DATA WORDS

[75] Inventors: Se J. Hong, Yorktown Heights; Ravindra Nair, Peekskill, both of N.Y.

[73] Assignee: International Business Machines Corporation, Armonk, N.Y.

[21] Appl. No.: 454,813

[22] Filed: Dec. 30, 1982

[51] Int. Cl.³ .............................................. G06F 7/02
[52] U.S. Cl. .................................. 340/146.2; 364/715
[58] Field of Search ...................... 340/146.2; 364/715

[56] References Cited

U.S. PATENT DOCUMENTS 4,007,439 2/1977 Semmelhaack et al. ......... 340/146.2
4,446,452 5/1984 Munter .............................. 340/146.2

OTHER PUBLICATIONS

Shirley, "Parallel-Search Max/Min Word Algorithm", *IBM Tech. Disclosure Bulletin*, vol. 22, No. 7, Dec. 1979, pp. 2671-2672.
Yuen, "A Bit-Serial Device for Maximization & Sorting", *Proceedings of the IEEE*, vol. 68, No. 2, Feb. 1980, pp. 266-267.
Gourlay et al., "Circuit for Finding the Minimum or Maximum of a Set of Binary Numbers", *IBM Tech. Disclosure Bulletin*, vol. 25, No. 7A, Dec. 1982, pp. 3318-3320.

*Primary Examiner*—David H. Malzahn
*Attorney, Agent, or Firm*—Sughrue, Mion, Zinn, Macpeak and Seas

[57] ABSTRACT

A method and apparatus for very rapidly determining a minimum or maximum data word from a list of such words in which the expected time for completing the determination of the minimum or maximum value decreases as the number of words in the list is increased. Each data word is stored in a dedicated processing element. Each processing element first outputs onto an open-collector bus a "0" in a position corresponding to the highest order "1" bit in the stored data word. The data signal thus assembled on the bus thus has a "0" at positions corresponding to the highest order "1" bit of each of the processing elements. In response to this data signal, a single controller transmits back to the processing elements a control signal having a "0" in and only in the lowest order "0" bit of the data signal received on the bus. In the processing elements, ones of the processing elements which have a "1" bit in a higher position than the single "0" bit of the control signal are eliminated, while in processing elements still active, "1" bits are eliminated from the stored data word in the same position as the "0" of the control signal. The most significant "1" bit of the modified control word in each processing element is again determined, and the process repeated until only a single processing element, or multiple processing elements in which the same data word is stored, is left transmitting back to the controller. In that processing element is stored the minimum or maximum data word.

21 Claims, 12 Drawing Figures

SYSTEM BLOCK DIAGRAM

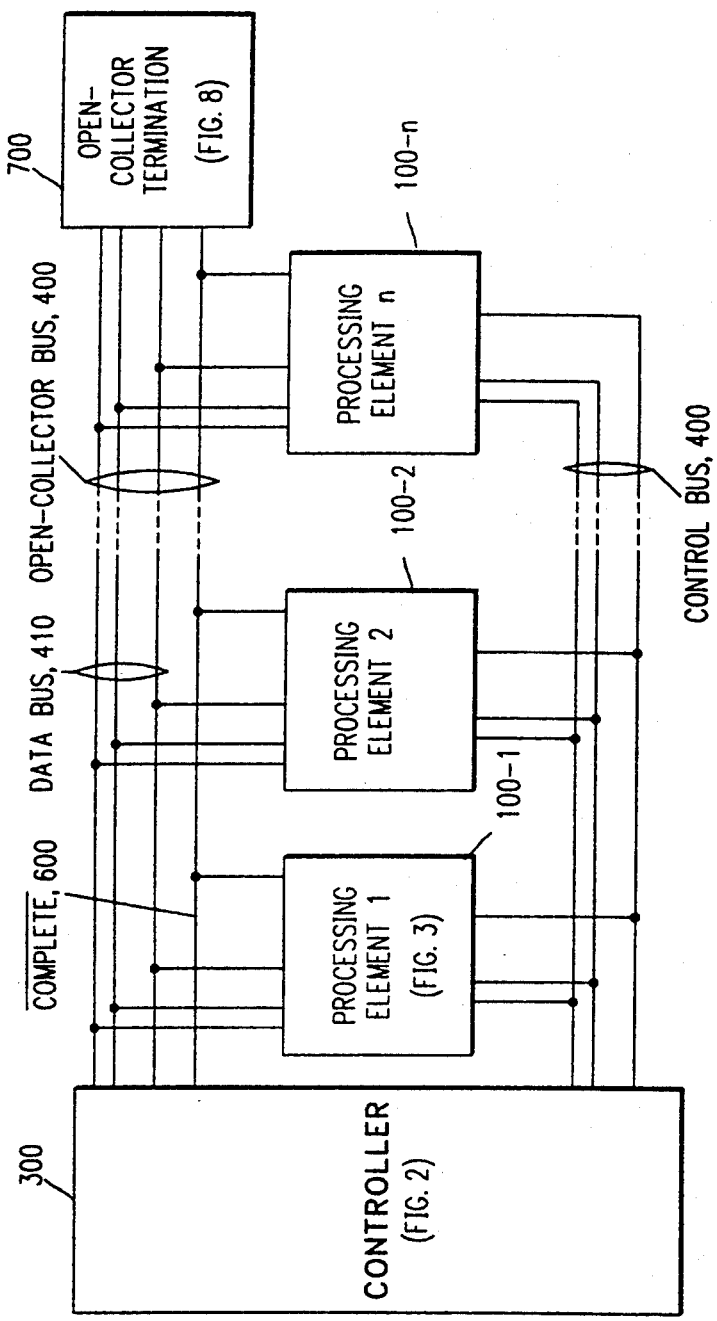

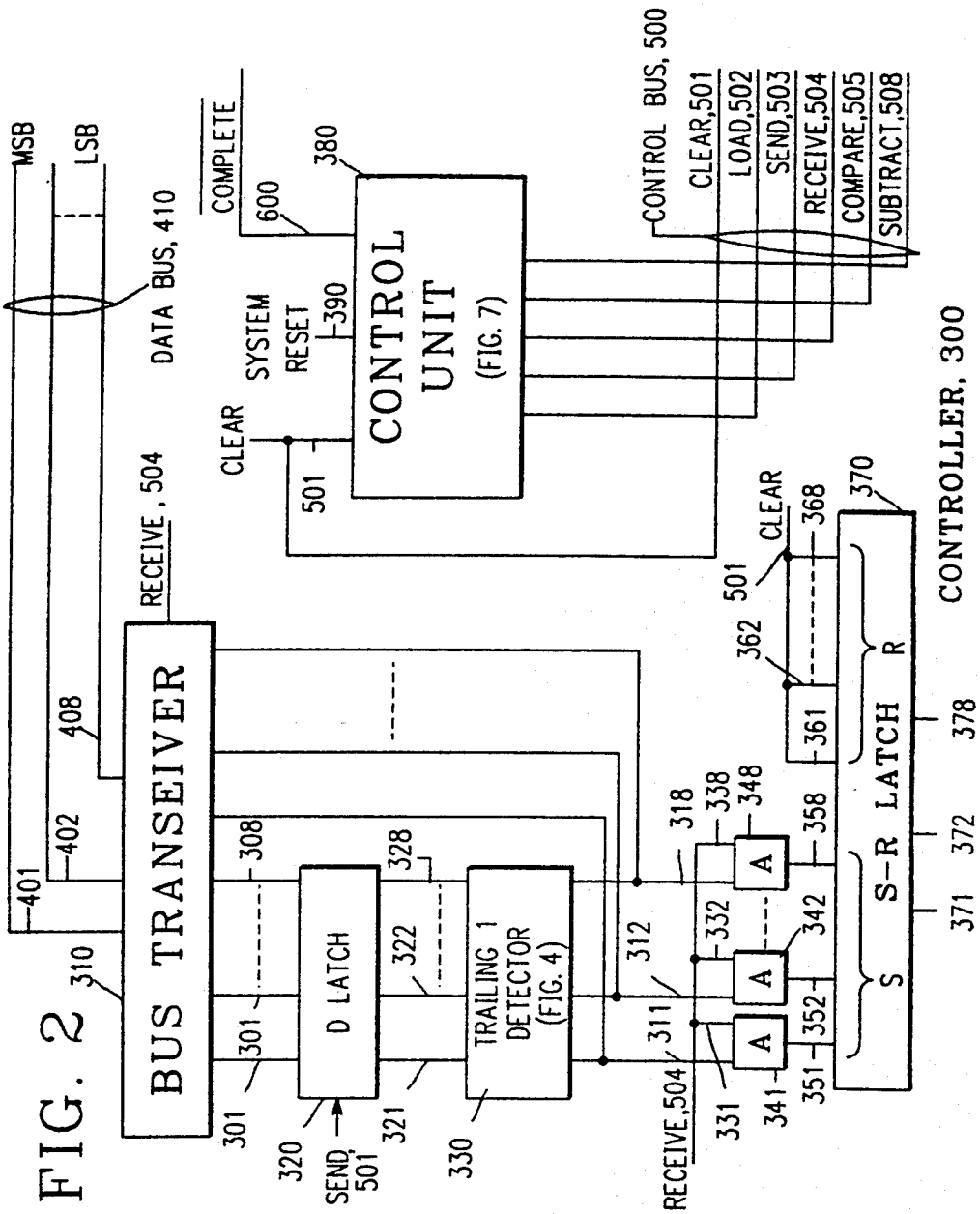

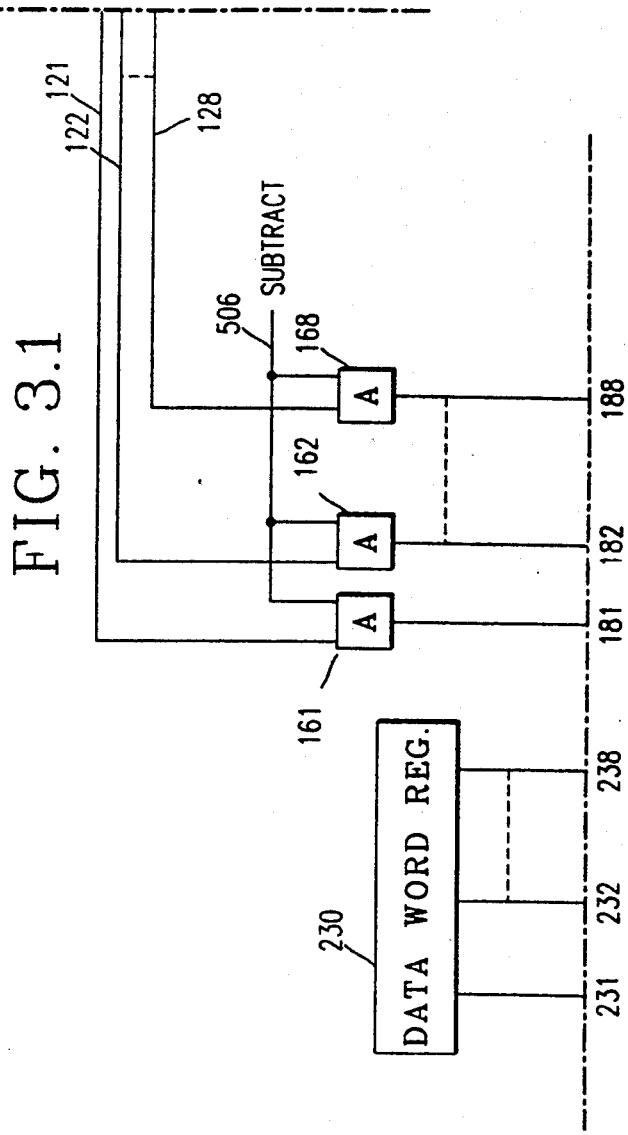

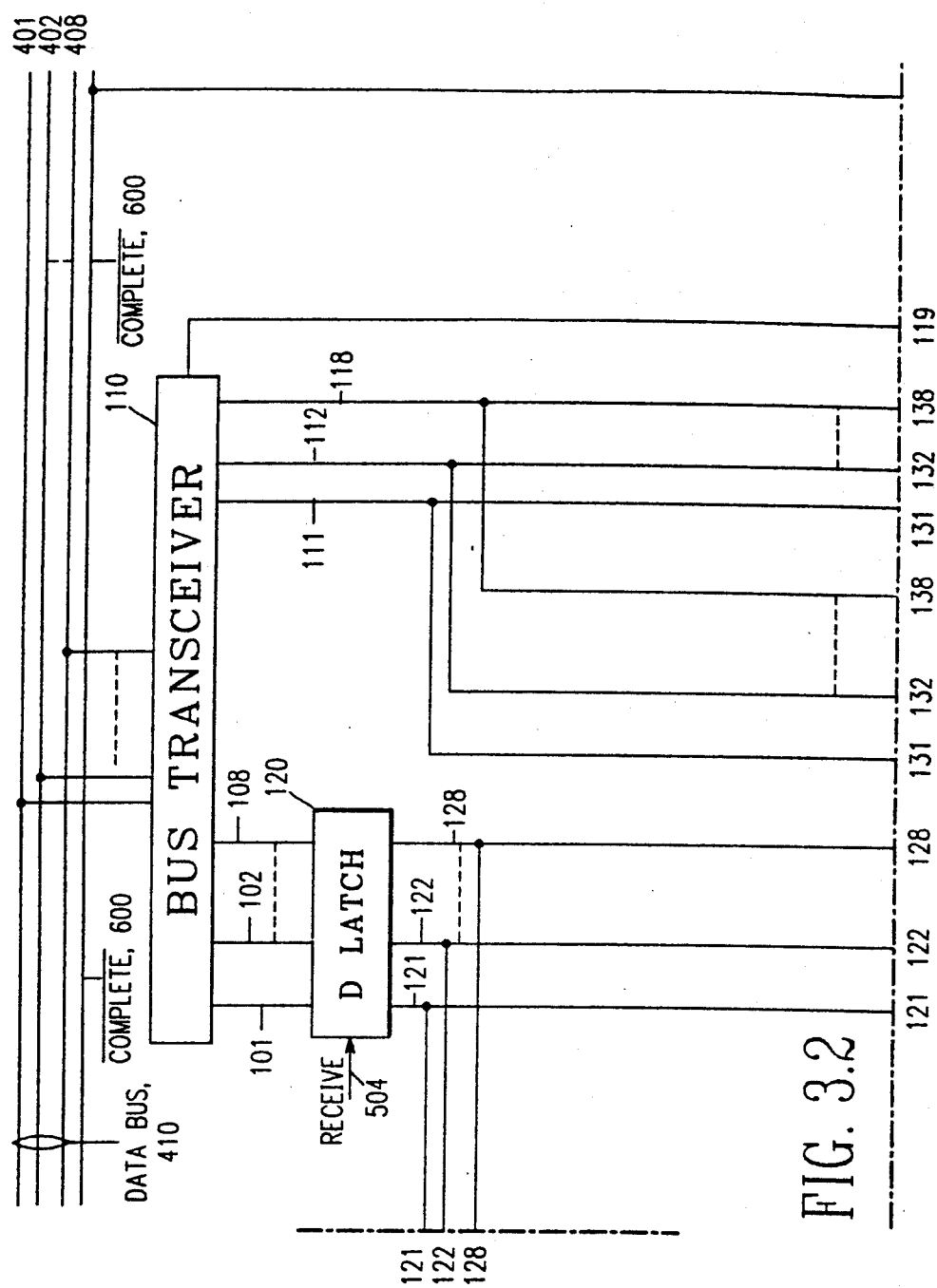
FIG. 3.2

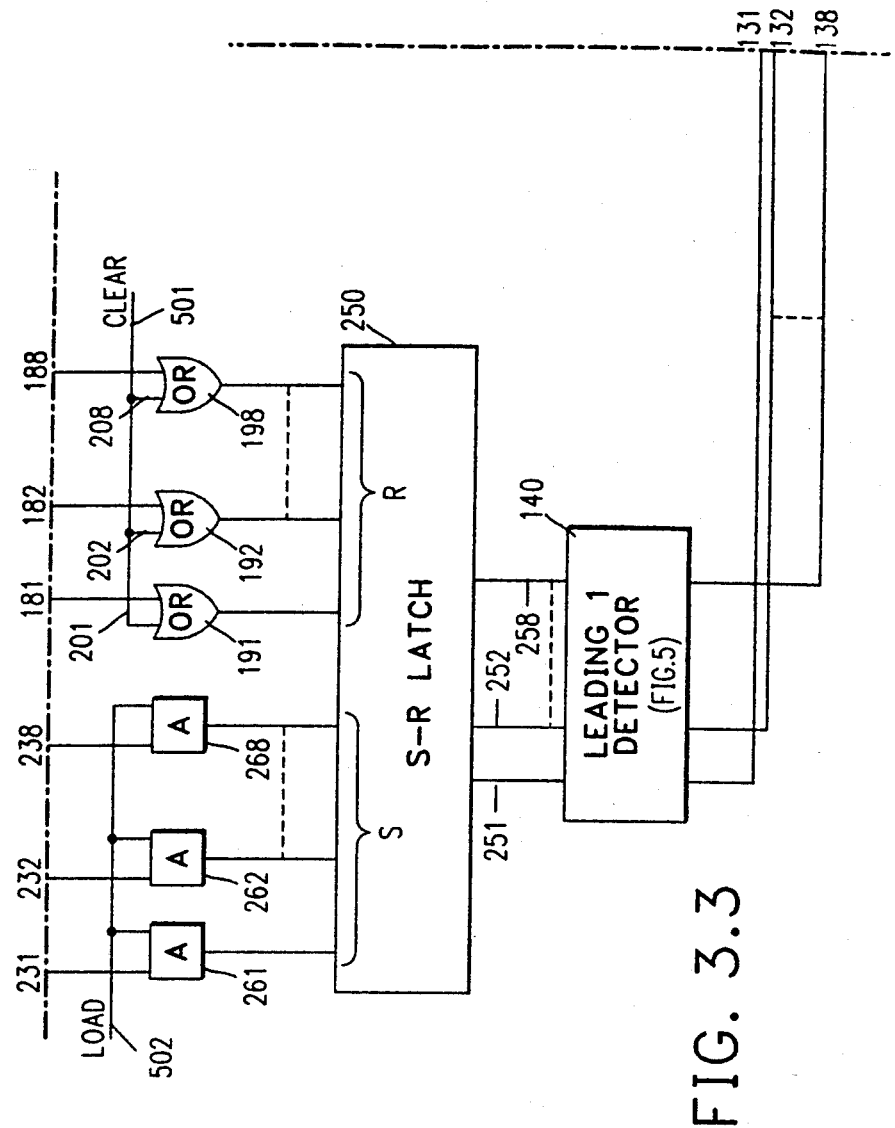
FIG. 3.3

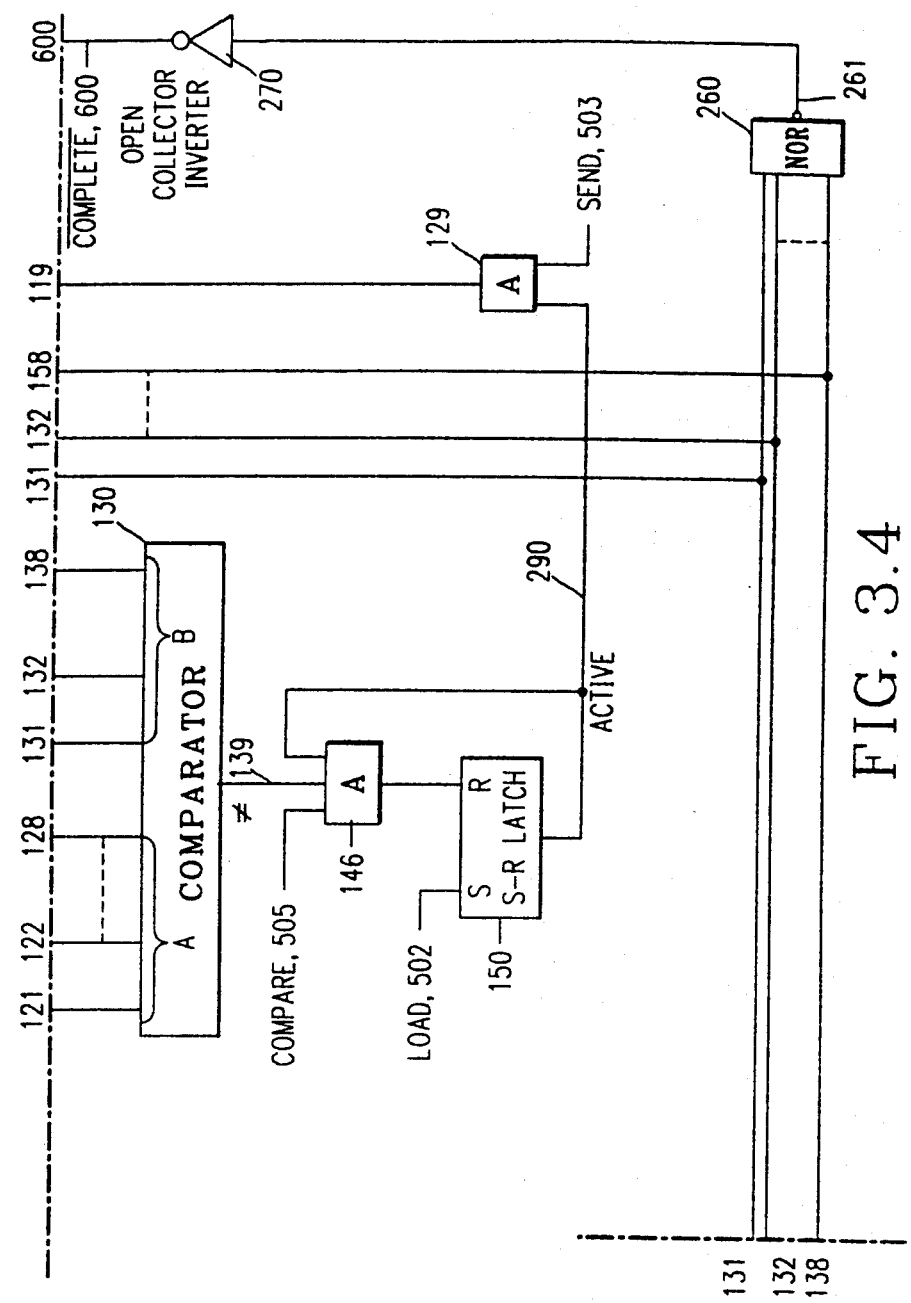
FIG. 3.4

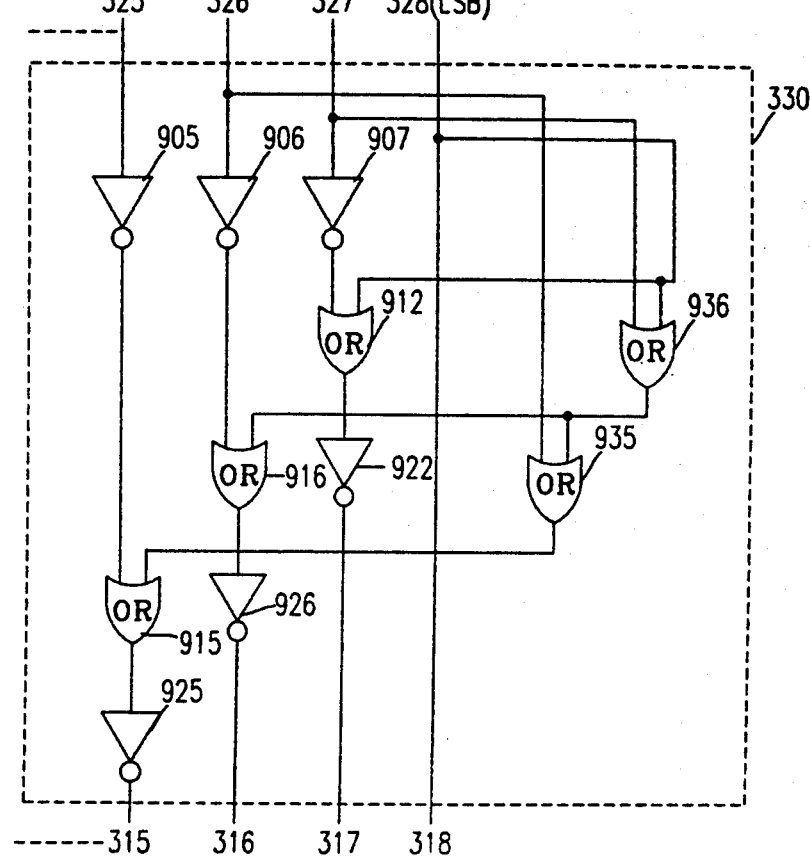
FIG. 4 TRAILING 1 DET. (4 BITS)

FIG. 5   LEADING 1 DET. (4 BITS)
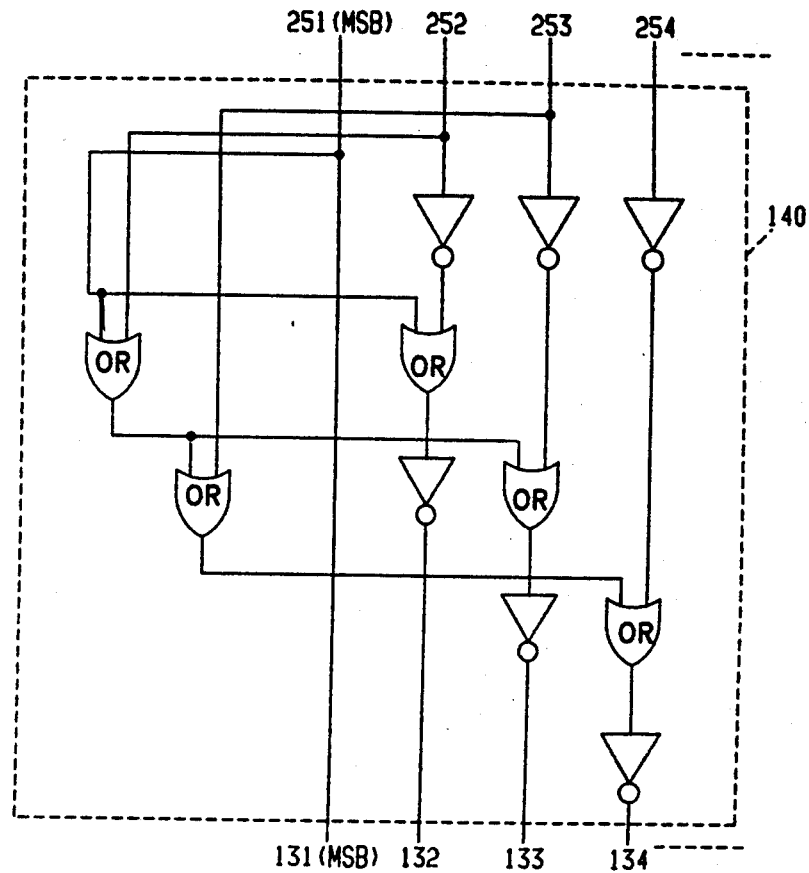

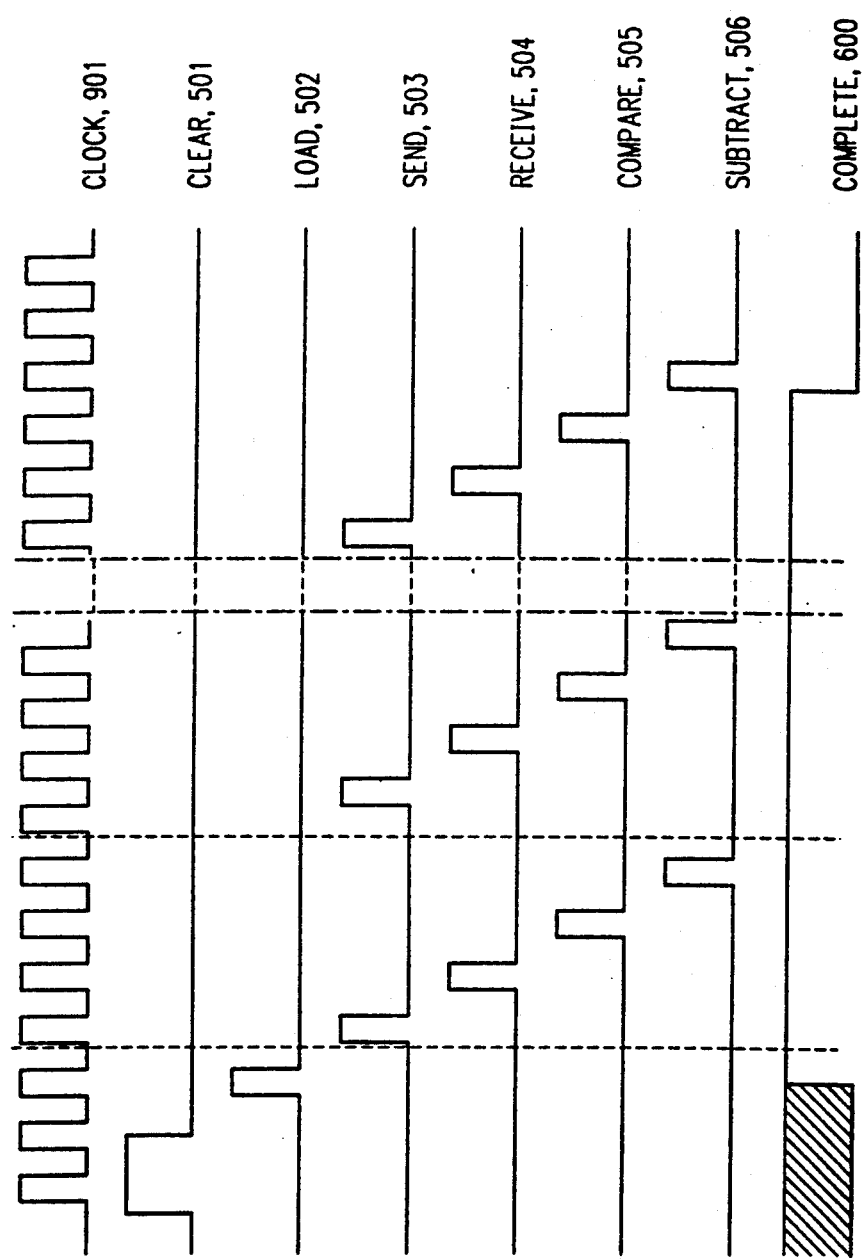
FIG. 6  CONTROL SIGNALS TIMING DIAGRAM

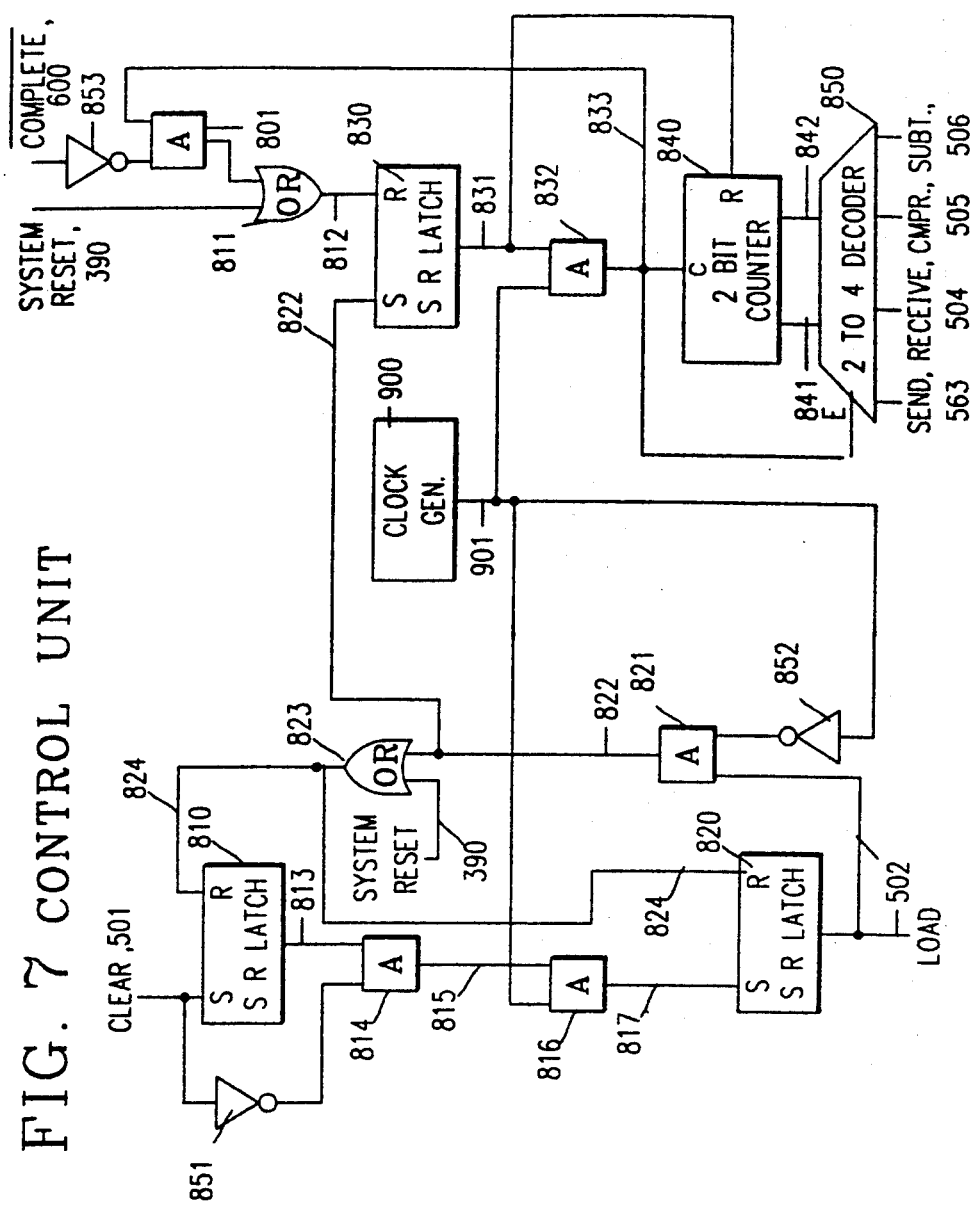
FIG. 7 CONTROL UNIT

OPEN COLLECTOR TERMINATION

METHOD AND APPARATUS FOR DETERMINING MINIMUM/MAXIMUM OF MULTIPLE DATA WORDS

DESCRIPTION

1. Technical Field

The invention pertains to a method and apparatus for determining the minimum or maximum among a plurality of data values, hereinafter termed "data words", in a list of such words.

2. Prior Art

Perhaps the most common technique previously utilized for determining the minimum or maximum among a plurality of data words in a list was to store the words in a memory and compare them one by one. If it is desired to determine the minimum, for example, the first two words are compared, the lower valued one of the two words retained, and the other discarded. The retained data word is then compared with the third data word in the list, and the lower valued one of these words retained for comparison with the fourth data word. The process is repeated through the last word in the list. This technique is disadvantageous in that it requires a complete read-and-compare operation for each data word in the list; the longer the list, the longer it takes to complete the procedure.

In a second rather straightforward prior art scheme, the various data words in the list are paired. All of the pairs are simultaneously compared in a first comparison stage, and, if a minimum is to be determined, for instance, the lower valued one of the two words of each pair retained as the output of the first stage. In a second comparison stage, the outputs of the first comparison stage are paired and compared. The process is completed through a number of stages equal to $\log_2 N$, where N is the number of data words in the list. This approach is also disadvantageous in that the time required for completing the determination of the minimum or maximum word in the list increases as the number of words in the list increases, although not as fast as in the previously described case. Moreover, this approach is additionally disadvantageous in requiring a large amount of hardware for implementation.

IBM Technical Disclosure Bulletin, Vol. 22, No. 7, December 1979, describes a parallel-search maximum/minimum determining algorithm for relatively quickly determining the maximum or minimum data word among a large number of words. Starting with the most significant bit of each word, in order to determine a maximum, for example, those words having a zero in this position are eliminated (except when all the words have a zero in this position). The remaining words are then tested for zeros in the next-to-the most-significant bit position, and those words having a zero in that position are eliminated. The process continues through all of the bits of the words. At the end of the process, at least one word will remain, this word having the maximum value. If more than one word remains, they all have equal and maximum values. Although this approach may be advantageous over those described in some situations, nevertheless, it is still disadvantageous in that a complete test-and-eliminate/retain cycle is required for each bit. Hence, the longer the word length, the longer the time required to find the maximum or minimum value.

IBM Technical Disclosure Bulletin, Vol. 13, No. 10, March 1971, describes a logic circuit for rapidly comparing two binary numbers and indicating whether or not they are within a predetermined binary tolerance. Although very rapid calculations can be performed using two data words, the circuit is incapable of rapidly determining the maximum among a long list of data words.

Accordingly, it is and object of the present invention to provide a method and apparatus for very rapidly determining the maximum or minimum among a plurality of data words in a list.

More specifically, it is an object of the present invention to provide such a method and apparatus for determining the maximum or minimum among a plurality of data words in a list wherein the time that it takes to complete the determination of the maximum or minimum value does not increase as the number of words in the list is increased.

Yet, further, it is an object of the present invention to provide such a method and apparatus in which the total time required to determine the maximum or minimum among the data words in the list actually decreases as the number of words in the list is increased.

SUMMARY OF THE INVENTION

These, as well as other objects of the invention, are met by a method and apparatus for determining the minimum or maximum value among data words in a list in which each of the data words is first stored in a corresponding dedicated processing element. Subsequently, there is outputted from each of the processing elements a first multi-bit signal having a predetermined bit state only in a position corresponding to the position of the highest order non-zero bit of the data word stored in the processing element. As used herein, "multi-bit signal" includes signals in which each position can be in any of three states, "0", "1" or "open", as well as signals in which each position can be in only the "0" and "1" states. A second multi-bit signal is then assembled having the predetermined bit state in positions corresponding to each of the above-mentioned positions from among all of the processing elements. The predetermined bit state is eliminated from the second multi-bit signal in all positions in which it occurs except for a lowest order position to thus provide a third multi-bit signal. If a processing element contains a data word having a non-zero bit in a higher position than the position of the single bit in the predetermined state in the third multi-bit signal, that processing element is deactivated, that is, prevented from outputting its first multi-bit signal. In the processing elements which are not deactivated, any non-zero bit is eliminated from the stored data word in the same position as the bit position in predetermined state in the third multi-bit signal.

The steps of the process are repeated until only a single processing element, or plural processing elements in which are stored the same data word, remain active. That processing element will contain the minimum or maximum data word.

In order to determine a minimum, the data words are stored in uncomplemented form. If it is desired to determine a maximum, the data words are stored in complemented form.

More specifically, the above and other objects of the invention are met by a method and apparatus for determining the minimum or maximum value among data words in a list in which each of the data words is initially stored in a corresponding dedicated processing element. Each processing element, concurrently with all other processing elements, outputs onto a common open-collector bus a "0" only in a position corresponding to the highest order "1" bit in the data word stored in the processing element. The remaining outputs from each processing elements are in the open state. The resulting data signal on the bus, which is the bit-by-bit low-truth OR of the output signals from all of the processing elements, is communicated to a controller. The controller complements the data signal and removes all "1" bits from the complemented signal except for the lowest order "1" bit. The result is complemented and transmitted back to the processing elements as a control signal via the open-collector bus. In response to this control signal, each processing element that has a "1" bit in a higher order position than the single "0" bit in the control signal is eliminated.

Among the processing elements which remain active, a "1" bit in the same bit position as the single "0" bit in the control signal is eliminated from the stored data word. The process is repeated until only a single processing element, or plural processing elements in which are stored the same data word, is left transmitting a data signal to the controller, that processing element containing the minimum or maximum value.

BRIEF DESCRIPTION OF THE DRAWINGS

FIG. 1 is a system block diagram of an apparatus of the invention for determining the minimum or maximum among data words in a list of data words;

FIG. 2 is a logic diagram of a controller used in the apparatus of FIG. 1;

FIG. 3, which is composed of FIGS. 3.1 through 3.4 taken together and placed as shown in the small diagram, is a logic diagram of one of the processing elements used in the apparatus of FIG. 1;

FIG. 4 is a logic diagram of a trailing one detector utilized in the controller of FIG. 2;

FIG. 5 is a logic diagram of a leading one detector utilized in the processing element of FIG. 3;

FIG. 6 is a timing diagram used to explain the operation of the controller and processing elements;

FIG. 7 is a logic diagram of a control unit which forms a part of the controller illustrated in FIG. 2.

DETAILED DESCRIPTION OF THE PREFERRED EMBODIMENTS OF THE INVENTION

Figure 8:
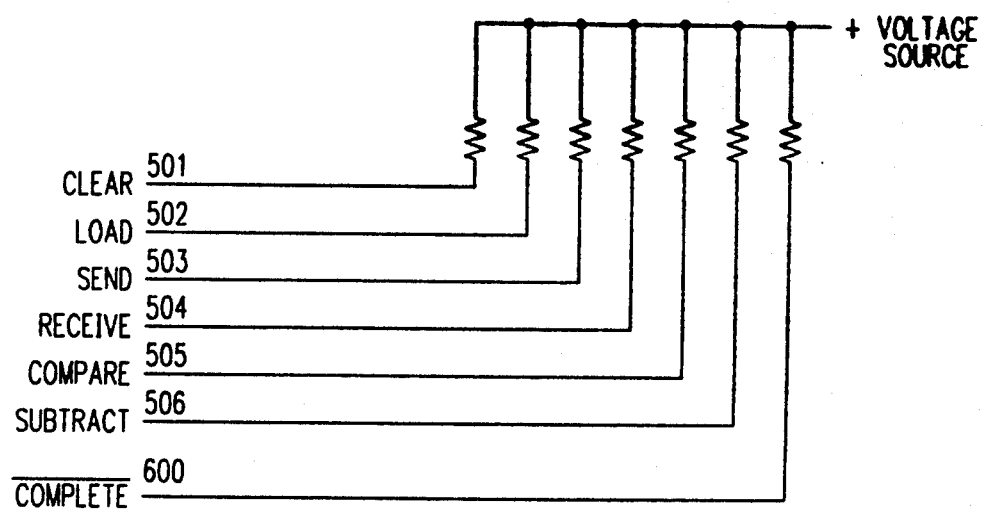
FIG. 8 is a schematic diagram of an open-collector bus termination circuit used in the apparatus of FIG. 1.

FIG. 1 is a system block diagram of an apparatus of the invention for determining the minimum or maximum among data words in a list. The apparatus includes a controller 300 coupled to a plurality of processing elements 100-1 through 100-n (where n is the number of words in the list) via an open-collector bus 400, includes a data bus 410 and a COMPLETE line 600, and a control bus 500. The open-collector bus 400 is terminated, in a well-known manner, with an open-collector termination circuit 700 (FIG. 8). At the beginning of an operation to determine the maximum or minimum value among data words in a list, each data word is stored in a respective one of the processing elements 100-1 through 100-n.

At the beginning of a minimum/maximum determination operation, each of the processing elements 100-1 through 100-n outputs onto the data bus 410 a single bit in the "0" state in a bit position corresponding to the position of the most significant "1" bit of its data word. The remainder of the output lines from the processing element are placed in the open state. As a result, a data signal is produced on the open-collector bus 400 which is the complement (one's complement) of the bit-by-bit logical OR of words composed of the highest order "1" bits of all of the data words.

In response to the data signal on the open-collector bus 400, the controller 300 produces and returns to the processing elements a control signal on the data bus 410 which has a "0" only in the position of the lowest order "0" in the data signal. Each processing element that has a "1" bit in its data word in a higher order position than the single "0" bit in the control signal is eliminated by effectively disconnecting the respective processing element from the bus 400. That is, an eliminated processing element is no longer permitted to contribute a "0" bit to the data signal on the open-collector data bus 410 and cannot activate the COMPLETE signal line 600. In the remaining processing elements, "1" bits are eliminated from the stored data word which are in the same position as the single "0" bit in the control signal. A new data signal is then produced from the modified data words.

In a second processing step, the new data signal on the data bus 410 is converted by the controller 300 into a new control signal which is transmitted back to the processing elements 100-1 through 100-n on the data bus 410. Among the processing elements then still active, processing elements are eliminated which have a "1" bit in a higher order position than the "0" bit of the control signal, and, in the processing elements which remain active, "1" bits are eliminated from the stored word which are in the same position as the single "0" bit then present in the control signal. A third data signal is then produced on the bus. This procedure is continued until only a single processing element is left transmitting a data signal to the controller. That processing element contains the minimum data word.

Referring now to FIG. 2, the construction of the controller 300 will be described in detail. In the example given, it is assumed that an eight-bit data word length is employed. Of course, words of any desired length can be used.

The lines 401–408 of the data bus 410 are connected to the bus port of a bus transceiver 310. The direction of transmission through the bus transceiver 310 is controlled by a RECEIVE signal on a line 504 produced by a control unit 380. When line 504 is in the "1" state, a data signal received on the lines 401–408 of data bus 410 is passed, in complemented form, to respective output lines 301–308. On the other hand, when the signal on line 504 is in the "0" state, input lines 311–318 to the bus transceiver 310 are coupled to the corresponding lines 401–408 of the open-collector data bus 410, with each bit being complemented upon passage through the bus transceiver 310. A Signetics Corporation integrated circuit type 8T38 may be used for implementing the bus transceiver 310.

When a SEND signal on a line 502 goes to the "1" state from the "0" state, the value presented by the signals on lines 301–308 is stored in a D latch register 320. A trailing one detector 330, in response to the output from the D latch register 320 on lines 321–328, sets on output lines 311–318 a "1" on only that line corresponding to the one of lines 321–328 having the lowest order "1" bit. For instance, if line 328 is in the "1" state, then line 318 is set to "1", and all of lines 311–317 are set to "0"; if line 328 is "0" and line 327 is "1", line 317 is set to "1", and lines 311–316 and 318 are set to "0"; if lines 328 and 327 are "0" and line 326 is "1", line 316 is set to "1" and lines 311–315, 317 and 318 are set to "0"; etc. No more than one of lines 311–318 can be in the "1" state at any one time. The detailed structure of the trailing one detector 330 will be described below with reference to FIG. 4.

The output lines 311–318 from the trailing one detector 330 are applied to the input port of the bus transceiver 310 for transmission, when the RECEIVE signal on line 505 is in the "0" state, via the data bus 410 to the processing elements 100-1 through 100-n. The output lines 311–318 from the trailing one detector 330 also form the first inputs to a set of AND gates 341–348. The second inputs 331–338 to the AND gates 341–348 are supplied the RECEIVE signal on line 504. The outputs 351–358 of the AND gates 341–348 are applied as inputs to corresponding S terminals of an S-R latch register 370. The latch register 370 is reset to the all "0"S state at the beginning of a minimum/maximum determination procedure by a CLEAR signal on a line 501 which is applied to all R terminals 361–368. During the minimum/maximum determination procedure, the minimum or maximum value is set in the S-R latch register 370 one "1" bit at a time, one "1" bit for each pulse of the RECEIVE signal. Thus, at the end of the procedure, the minimum or maximum value will be present on the output lines 371–378 of the latch register 370.

The control unit 380 will next be described, still now with reference to FIG. 2. The control unit 380 receives from an external processor (not shown) a SYSTEM RESET signal on line 390 and a CLEAR signal on line 501. The SYSTEM RESET signal is set briefly to the "1" state at the power-up time of the system. As indicated in the timing diagram of FIG. 6, the CLEAR signal on line 501 transits through the "1" state each time that a minimum/maximum determination procedure is to be carried out so as to set the various logic elements of the controller 300 and processing elements 100-1 through 100-n in appropriate start-up states. The control unit 380 also receives the COMPLETE signal on line 600 from the open-collector bus 400.

Operating in response to the CLEAR, SYSTEM RESET and COMPLETE signals, the control unit 380 produces a LOAD signal on a line 502, SEND signal on a line 503, a RECEIVE signal on line 504, a COMPARE signal on a line 505, and a SUBTRACT signal on a line 506. The CLEAR, LOAD, SEND, RECEIVE, COMPARE AND SUBTRACT signals are transmitted to the processing elements 100-1 through 100-n upon the control bus 500. Additionally, as indicated in the discussion above, the CLEAR, SEND and RECEIVE signals are utilized within the controller 380.

Referring now to FIG. 7, a detailed logic implementation of the control unit 380 will be described with simultaneous reference to the timing diagram of FIG. 6. The CLEAR signal on line 501 is applied to the S terminal of an S-R latch 810. The CLEAR signal on line 501 is also applied through an inverter 851 to one input of an AND gate 814. The other input of the AND gate receives the output of the S-R latch 810. A continuous train of clock pulses is produced by a clock generator 900. The clock signal, on a line 901, is applied to one input of an AND gate 816, the other input of which receives the output of the AND gate 814. The output of the AND gate 816 is applied to the S terminal of an S-R latch 820. The LOAD signal is produced on the line 502 at the output of S-R latch 820. That signal is applied to the first input of AND gate 821, the second input of which receives the inverted clock signal through an inverter 852. The output of AND gate 821 forms one input to an OR gate 823, a second input of which is supplied by the SYSTEM RESET on line 390. The output of the OR gate 823 is applied to the R terminals of S-R latches 810 and 820.

The output from the AND gate 821 also is applied to the S terminal of a third S-R latch 830. The SYSTEM RESET signal on line 390 is applied through an OR gate 811 on line 812 to the R terminal of the S-R latch 830. The COMPLETE signal on line 600 is inverted by an inverter 853 and applied to one input of an AND gate 801, the other input of which is supplied by the output of an AND gate 832. The output of the AND gate 801 forms the second input to the OR gate 811. One input of the AND gate 832 receives the output of the S-R latch 830, and the second receives the clock signal on line 901. The output from the AND gate 832 is fed to the block input of a two-bit (modulo four) counter 840. The reset input of the counter 840 receives the signal produced at the output of the S-R latch 830. The output lines 841 and 842 of the counter 840 are applied to the input port of a two-to-four decoder 850. An enable input of the two-to-four decoder 850 receives the output of AND gate 832. The SEND signal on line 503 is generated when the decoder 850 receives "00" from the counter 840, the RECEIVE signal on line 504 when "01" is received, the COMPARE signal on line 505 when "10" is generated by the counter, and the SUBTRACT signal on line 506 when "11" is produced.

Referring now to FIG. 4, there is shown a logic diagram of the trailing one detector 330. For convenience of description, only the circuitry for the four least significant bits of the trailing one detector 330 is shown. However, the circuitry for the remaining bit positions can be derived merely by reduplicating circuit elements shown in FIG. 4.

The least-significant bit input line 328 is coupled directly through the trailing one detector 330 to the corresponding output line 318. The next-to-the-least-significant bit line 327 is applied through an inverter 907 to a first input of an OR gate 917, the second input of which is the least-significant bit line 328. The output of the OR gate 917 is inverted by an inverter 927 and applied to the output line 317. The input line 326, similarly, is applied through an inverter 906 to a first input of an OR gate 916, the second input which is supplied from the output of an OR gate 936. The OR gate 936 receives its inputs from the least-significant bit line 328 and the next-to-the least-significant bit line 327. The circuit for the input line 325 is similar, except that the OR gate 325 associated with the input line 325 receives its second input from the output of the OR gate 936.

Operationally, if the input line 328 is in the "1" state, the corresponding output line 318 will, of course, be in the same state. The "1" on the line 328 is propagated through the OR gates 936, 935, etc., thereby setting the outputs of both of the OR gates 916 and 915 in the "1" state, and hence outputting "0"s on lines 315 and 316. The output line 317 is set to "0" due to the "1" applied to the second input of the OR gate 917. If the line 328 is "0" and the adjacent line 327 "1", by similarly tracing through the operation of the circuit, it may be verified that the line 317 is in the "1" state, while the remainder of the output lines are "0". The operation of the circuit shown in FIG. 4 can similarly be verified for each of the input lines 325–328.

Turning now to FIG. 3, the construction of one of the processing elements 100-1 through 100-n will be described. Lines 401–408 from the data bus 410 are applied to the bus port of a bus transceiver 110, which may be of the same construction as the bus transceiver 310 of the controller 300. Output lines 101–108 from the bus transceiver 110, which receive the control signal from the bus 410 (in complemented form) when a control line 119 is in the "0" state, are applied as inputs of a D latch register 120. The value present on lines 101–108 is stored in the D latch register 120 for each pulse of the RECEIVE signal on line 504. The inputs to the bus transceiver 110 on lines 111–118 are complemented and applied to respective lines 401–408 of the data bus 410 when the signal on line 119 is in the "1" state. The output lines 121–128 from the D latch register 120 are applied as first inputs to respective AND gate 161–168. The second inputs of each of the AND gates 161–168 receive the SUBTRACT signal on line 506. The SUBTRACT signal thus serves to enable the received control word held in the D latch register 120 onto output lines 181–188 from corresponding ones of the AND gates 161–168. The data word for the particular processing element is stored in advance in a data word register 230, and is thus continuously present on output lines 231–238.

The outputs from the AND gates 161–168 on lines 181–188, respectively, are applied to first inputs of corresponding OR gates 191–198. The second inputs 201–208 of the OR gates 191–198 receive the CLEAR signal on line 501. The output lines 231–238 from the data word register 230 are connected to first inputs of respective AND gates 261–268, the second inputs of which each receive the LOAD signal from line 502. Outputs of the AND gates 261–268 are applied to corresponding S terminals of an S-R latch register 250, while the outputs of the OR gates 191 are applied to respective R terminals thereof. The outputs of the S-R latch register 250 on lines 251–258 are applied to a leading one detector 140, shown in detail in FIG. 5 below. It is the function of the leading one detector 140 to set to the "1" state the one of the output lines 131–138 which corresponds in bit position to the one of the input lines carrying the highest order "1" and the others of the output lines 131–138 to the "0" state. For example, if the input line 251 is "1", then corresponding output line 131 is set to "1", and all other lines 132–138 set to "0"; if line 251 is "0" and 252 is "1", line 132 is set to "1" and lines 131 and 133–138 to "0"; if lines 251 and 252 are "0" and line 253 is "1", line 133 is set to "1", and lines 131, 132 and 134–138 are set to "0"; etc. No more than one of lines 131–138 can be in the "1" state at any time.

Referring now to FIG. 5, the circuitry of the leading one detector 140 is depicted. The circuitry of the leading one detector 140 is essentially the mirror image of the trailing one detector 330 shown in FIG. 4. It can easily be verified that the leading one detector 140 operates as described above by following the examples described above.

Returning to FIG. 3, the output lines 131–138 from the leading one detector 140 are applied to one input port B of a comparator 130. The complemented control signal stored in the D latch register 120 and present on lines 121–128 is applied to the other input port A of the comparator 130. The output of the comparator 130 is the "1" state when the values applied to the ports A and B are unequal.

The output of the comparator 130 is applied to one input of a three-input AND gate 146, a second input of which receives the COMPARE signal on line 505. The output of the AND gate 146 is applied to the R terminal of a S-R latch 150. The S terminal of the S-R latch 150 receives the LOAD signal from line 502. The output of the S-R latch 150 on line 290, termed the ACTIVE signal, is applied to the third input of the AND gate 146 and to a first input of an AND gate 129. As the term implies, the ACTIVE signal is the "1" state when the particular processing element is active, that is, when the processing element has not been eliminated. The SEND signal on line 503 is applied to the second input of the AND gate 129. The output of the AND gate 129 on line 119 forms the control signal which controls the operation of the bus transceiver 110.

Further, the output lines 131–138 from the leading one detector 140 are appled to inputs of a NOR gate 260. The output of the NOR gate is applied through an open-collector inverter 270 to the line 600 to participate in the generation of the COMPLETE signal. Specifically, the COMPLETE signal on line 600 is in the "0" (active) state when any output from any of the NOR gates 260 of any of the processors 100-1 through 100-n is in the "1" state.

FIG. 8 depicts schematically the open-collector termination 700 of FIG. 1. As this circuit is quite simple and is of a very well-known construction, it will not be discussed in any detail.

The operation of the above-described apparatus will now be discussed with reference to a case where there are three processing elements 100-1, 100-2 and 100-3, and where the data words stored in the data word registers 230 of the three processing element have values of 00101010, 00011010 and 00011100, respectively.

When the system power is turned on, the SYSTEM RESET signal on line 390 is pulsed through the "1" state. This causes the S-R latches 810, 820 and 830 of the control unit 380 to be reset to the "0" state. Resetting the S-R latch 830 shuts off the flow of clock pulses through the AND gate 832, thereby disabling the two-bit counter 840 and the decoder 850.

To begin the process of determining the minimum value among the three data words, the external controller sets the CLEAR signal on line 501 to "1" and then back to "0". The CLEAR signal sets the S-R latch 810, resets the S-R latch register 370 (FIG. 2) to all "0"s, and, in each of the three processing elements, resets the latch register 250 to all "0"s.

When the CLEAR signal on line 501 changes from "1" to "0", the output of the AND gate 814 on line 815 becomes "1", and at the rising edge of the next clock pulse on line 901, the S-R latch 820 is set through the AND gate 816. This generates a LOAD pulse on line 502, which has a duration of the positive width of the clock. At the next clock pulse, the latches 810 and 820 are both reset through the OR gate 823 and AND gate 821. Neither of the latches 810 and 820 can be set again until another CLEAR pulse is provided, thus ensuring there is only one LOAD signal pulse during the course of each minimum determination procedure.

The pulse outputted through the AND gate 821 on the line 822 which resets the latches 810 and 820 also sets the latch 830. The time period during which the output of the latch 830 is in the "1" state defines the time period during which the counter 840 remains active.

After the SYSTEM RESET pulse, the latch 830 can only be reset when the COMPLETE signal on line 600 is in the active ("0") state. So long as the output of the latch 830 is in the "1" state, the two-bit counter 840 cycles through counts of "00", "01", "10", "11", "00", "01" . . . starting at the first clock pulse following the LOAD pulse. The two-to-four decoder 850 during this period generates the required control signals SEND, RECEIVE, COMPARE and SUBTRACT in the sequence shown in FIG. 6.

With reference again to the diagram of the processing elements shown in FIG. 3, when a pulse of the LOAD signal is received, the data word stored in the data word register 230 is loaded into the S-R latch 250 through the AND gates 261–268. The LOAD pulse also sets the S-R latch 150, thus placing the active signal on line 290 in the "1" state. Following the operation described above, the leading one detectors 140 of the processing elements 100-1 through 100-3, in response to the examples of the data words stated above, produce on their output lines 131–138 values of 00100000, 00010000 and 00010000, respectively. Because at least one "1" is present at the output of each of the S-R latches 250 of each of the three processing elements in the example given, the NOR gate 260 of each processing element will output a value of "0", hence maintaining the COMPLETE line in the "1" state. It may be noted at this point that if one of the data words were 00000000, the output of the corresponding NOR gate 260 would be "1", hence setting the COMPLETE signal to the "0" state and ending the procedure immediately.

As shown in the timing diagram of FIG. 6, the next pulse to arrive is the SEND pulse. This pulse, ANDed with the ACTIVE signal by the AND gate 129, sets the bus transceiver 110 of each processing element to transmit the data then present on the output of the respective leading one detector 140 onto the data bus 410. Bearing in mind that the signals are complemented when passing through the bus transceiver 110, the values outputted by the three processing elements to the bus 140 are 11011111, 11101111 and 11101111, respectively. Because the open-collector action of the bus 400 allows any line to be pulled down to "0" by a "0" outputted by any processing element, the resulting value on the bus 410 which is presented to the bus transceiver 310 of the controller 300 is 11001111. The complement of this value, 00110000, is then transferred into the D latch register 320 and stored therein upon the receipt of a subsequent SEND pulse on line 502. Responding to the value then stored in the D latch register 320, the trailing one detector 330 of the controller 300, outputs the value 00010000 onto lines 311–318, that is, the line 314 (not specifically shown) is "1", while the remainder of the lines 311–318 are zero. Correspondingly, the output line 354 from the AND gate 344 (not specifically shown) is "1" when subsequently a pulse of the RECEIVE signal on line 504 is applied. The "1" on line 354 also sets the corresponding bit of the S-R latch register 370 to the "1" state.

The RECEIVE pulse also enables the bus transceiver 310 to transmit back to the processing elements as a control signal the complemented value from the output of the trailing one detector 330; that is, a value of 11101111 is placed on the data bus 410 by the controller 300 during the time that the RECEIVE signal is in the "1" state.

Back in the processing elements, the respective bus transceivers 110 complement the value then present on the data bus 410 and register it in the corresponding D latch register 120. The inputs and outputs of the comparators 130 of the three processing elements just before the arrival of the next pulse, the COMPARE pulse, are as follows:

Processing element 100-1: A—00010000, B—00100000, Line 139-1;
Processing element 100-2: A—00010000, B—00010000, Line 139-0; and
Processing element 100-3: A—00010000, B—00010000, Line 139-0.

When the COMPARE pulse is in the "1" state, the S-R latch 150 for the processing element 100-1 is reset to the "0" state (ACTIVE signal in the "0" state) because the A and B input values to the comparator 130 are different. On the other hand, the S-R latches 150 for the processing elements 100-2 and 100-3 are not reset and the ACTIVE line 290 remains in the "1" state since the A and B input values are the same. The bus transceiver 110 for the processing element 100-1 is therefore prevented from transmitting signals onto the bus 410 for the remainder of the procedure because its control line 119 is in the "0" state.

The SUBTRACT pulse, the last pulse in the cycle, places on the R inputs of each of the S-R latch registers 250 in each of the three processing elements the value 00010000. The output values from the respective latch registers 250 of the processing elements 100-1, 100-2 and 100-3 change from 00101010, 00011010 and 00011100 to 00101010, 00001010 and 00001100, respectively. That is, in the two active processing elements 100-2 and 100-3, the most significant "1" bit of the data word as originally stored in the respective registers 250 is set to "0". The leading one detectors 140 of the processing elements 100-2 and 100-3 then output values of 000010000 and 00001000. Because a "1" bit is present in the output values from the two leading one detectors of the two active processing elements, the outputs of their NOR gates 260 remain in the "0" state, leaving the COMPLETE line 600 in the "1" state.

In the beginning of the next (second) cycle, the bus transceiver 310 of the controller 300, receiving the value 11110111 from the data bus 410, outputs a value of 00001000 to the trailing one detector 330 which, since only a single "1" bit is set, outputs the same value 00001000. The S-R latch register 370, in response to the pulse of the subsequent RECEIVE signal, stores the additional "1" bit; that is, its output value changes from 00010000 to 00011000.

The complemented value 11110111 is transmitted back as the control signal to the processing elements when the RECEIVE signal goes to the "1" state, with the D latch registers 120 in the processing elements storing in response thereto the value 00001000. The A and B inputs of the comparators 130 of the two active processing element are both, in this situation, 00001000, and hence the outputs of the comparators 130 of the active processing elements remain "0", leaving the ACTIVE lines in the "1" state. The subsequent SUBTRACT pulse on line 506 then sets the values stored in the S-R latch registers 250 to 00100010, 00000010 and 00000100 in processing elements 100-1, 100-2 and 100-3, respectively. At least one "1" is present on the inputs of the NOR gates 260 of the processing elements, hence leaving the COMPLETE signal 600 in the "1" state. Values of 00000010 and 00000100 are sent to the bus transceivers 110 by the active processing elements 100-2 and 100-3, respectively, hence making the value of the data signal transmitted to the controller 300 on the data bus 410 11111001.

During the third cycle, complementing the received value of 11111001 from the data bus 410, the value 00000110 is stored in the D latch register 320 of the controller 300 and presented to the trailing one detector 330. In respons, the trailing one detector 330 outputs the value 00000010. Hence, the value held in the S-R latch register 370 is changed from 00011000 to 00011010. The controller 300 then returns the value 11111101 to the processing elements on the data bus 410, with the D latch registers 120 subsequently storing the values 00000010.

In the processing element 100-2, the comparator 130 then is presented A and B input values which are the same, while in the processing element 100-3, the A and B values remain unequal. Thus, the ACTIVE signal on line 290 of the processing element 100-2 is not reset to the "0" state upon receipt of the COMPARE pulse on line 505, while the ACTIVE signal of the processing element 100-3, to the contrary, is set to "0". The subsequent SUBTRACT pulse causes the values stored in the S-R latch registers 250 of the processing elements 100-1, 100-2 and 100-3 to be modified from 00100010, 00000010 and 00000100 to 00100010, 00000000 and 00000100, respectively. The 00000000 input to the NOR gate 260 of the processing element 100-2 causes the output of the NOR gate 260 to change to "1". This sets the COMPLETE line 600 in the "0" (active) state.

At the next clock pulse, the S-R latch 830 of the control unit 380 (FIG. 7) is reset, shutting off the flow of clock pulses to the two-bit counter 840 and terminating the generation of pulses of the control signals SEND, RECEIVE, COMPARE and SUBTRACT. The value 00011010 which is then present in the S-R latch register 370 of the controller 300 is the minimum of the three original data words 00101010, 00011010 and 00011100.

Further, because only in the processing element 100-2 is the output of the NOR gate 260 in the "1" state, it may be determined within the processing element 100-2 itself that the data word stored therein is the minimum among the three data words being compared. Thus, if desired, it is possible to eliminate the S-R latch register 370 in the controller 300 and simply transfer the data word stored in the data word register 230 of the processing element 100-2 to the location where it is to be utilized.

In the examples described above, the minimum value was found at the first clock pulse of the fourth complete cycle. Since the first cycle starts after the LOAD pulse and since there are four clock pulses in every cycle, the minimum was found at the fourteenth clock pulse after the CLEAR signal. It is observed that as long as the minimum value has not been found, every cycle must result in a new bit being set to "1" in the S-R register 370 of the controller. Thus, it may readily be appreciated that the number of complete cycles required to find a minimum value is equal to the number of bits which are "1" in the minimum value finally found.

In the Appendix below, it is mathematically proved that for a given data word size, and assuming a random distribution of numbers among the processing elements, that the expected time required with the invention to determine a minimum decreases as the number of data words to be compared increases. This is of course directly opposite the result obtained using the prior art techniques described above wherein the time required for determining a minimum generally increases as the number data words in a list increases.

The same circuitry described above can be used to determine a maximum. The only modification that is necessary is to complement the value of the data words stored in the data word register 230. Otherwise, the procedure is identically the same as described above.

This completes the description of the preferred embodiments of the invention. Although preferred embodiments have been described, it is believed that numerous alterations and modifications thereto would be apparent to one of ordinary skill in the art without departing from the spirit and scope of the invention.

APPENDIX

All the results obtained here assume that the numbers to be compared are random numbers, uniformly distributed in the range $0 \ldots (2^2-1)$, where b is the maximum number of bits in the binary representation of the numbers. Unless otherwise stated, n will refer to the number of numbers being compared, and h(b,n) will refer to the number of "1"s in the b-bit binary representation of the minimum among n numbers.

A: The number of steps required to be performed in the procedure described in h(b,n)+1.

Proof: In the procedure described, steps are performed only for the "1" bits of the minimum number, plus one initial step. The mechanism of "inactivation" ensures that no number whose retired bits are different from the retired bits of the minimum remains in contention.

B: The expected position of the leftmost "1" in a randomly chosen b-bit number (counting from the left) is:

$$2 - (1/2^b)$$

Proof: $P(k^{th}$ bit is a "1" but bits $1 \ldots k-1$ are $0) = (\frac{1}{2})^k$. Let $b+1$ be the position of the first 1 in the number 0. Then the expected position of the leftmost 1 is:

$$\sum_{k=1}^{b} k \left(\frac{1}{2}\right)^k + (b+1)\left(\frac{1}{2}\right)^b = 2 - \frac{1}{2^b}.$$

C: (i) $P(k \geq$ position of leftmost "1" in a number$) = 1 - 1/2^k$.

(ii) $P(k \geq$ position of leftmost "1" in the minimum of n numbers$)$ $$= \left(1 - \frac{1}{2^k}\right)^n, 0 < k \leq b.$$

Proof: $P(k \geq$ position of leftmost "1" in a number) is given by:

$$\sum_{i=1}^{k} \left(\frac{1}{2}\right)^i = 1 - \frac{1}{2^k},$$

$0 < k \leq b$. The result follows from the fact that each of the n numbers must have the leftmost "1" in a position $\leq k$, and from the assumption that the numbers are independent.

D: The expected value of a random variable $X = X(x)$, denoted by $E(X)$, is:

$$E(X) = \int_{-\infty}^{\infty} x \, dF_X(x).$$

where $F_X$ is the cumulative distribution function for x. This can also be written as:

$$E(X) = \int_0^{\infty} [1 - F_X(x)] \, dx - \int_{-\infty}^0 F_X(x) \, dx.$$

When $x \geq 0$, this becomes:

$$E(X) = \int_0^{\infty} [1 - F_X(x)] \, dx.$$

E: The expected position of the leftmost "1" in the minimum of n numbers is less than the expected position of the leftmost "1" in the minimum of $n+1$ numbers, assuming uniform distribution of the numbers in the range $0 \ldots 2^b - 1$.

Proof: from C(ii),

P (position of left most "1" in the minimum of n numbers $\leq k$) =

$$\left(1 - \frac{1}{2^k}\right)^n < \left(1 - \frac{1}{2^k}\right)^{n+1}, \, 0 < k \leq b,$$

the latter being P(position of leftmost "1" in the minimum of $n+1$ numbers $\leq k$).

Hence the cumulative distribution of the leftmost "1" position is strictly greater for n numbers than for $n+1$ numbers, for $0 < k \leq b$. They both become 1 for $k = b+1$. From D, the result follows.

Thus it is observed that the expected position of the leftmost "1" in the minimum of n numbers, which is $2 - (1/2^b)$ for $n = 1$, moves to the right as n increases, and eventually reaches $b+1$ when n becomes very large. Clearly, when this happens, the expected value of the minimum is 0, implying that no more than one step is required to find the minimum. Intuitively, this may also be explained by the fact that as the number of numbers grows very large, with a fixed value of b, the assumption of uniform distribution of numbers makes it highly probably that at least one of the numbers is 0, which automatically becomes the minimum.

F: From C above:
P(position of leftmost 1 in the minium = k)

$$\left(1 - \frac{1}{2^k}\right)^n - \left(1 - \frac{1}{2^{k-1}}\right)^n, \, 0 < k \leq b$$

$$1 - \left(1 - \frac{1}{2^b}\right)^n, \, k = b + 1.$$

Hence, the expected position 8 of the leftmost "1" in the minimum is:

$$q = (b+1)\left[1 - \left(1 - \frac{1}{2^b}\right)^n\right] +$$

-continued $$\sum_{k=1}^{b} k\left[\left(1 - \frac{1}{2^k}\right)^n - \left(1 - \frac{1}{2^{k-1}}\right)^n\right], \text{ or}$$

$$q = b + 1 - \left(1 - \frac{1}{2^b}\right)^n + \sum_{k=1}^{b-1}\left(1 - \frac{1}{2^k}\right)^n.$$

which is tabulated below for $b = 8$ and $b = 16$.

| n | Position for $b = 8$ | Position for $b = 16$ |
|---|---|---|
| 1 | 1.996 | 2 |
| 2 | 2.659 | 2.667 |
| 3 | 3.131 | 3.143 |
| 4 | 3.489 | 3.504 |
| 8 | 4.390 | 4.421 |
| 16 | 5.315 | 5.377 |
| 32 | 6.232 | 6.355 |
| $2 \times 10^4$ | 9 | 16.950 |

It is seen both from the expression as well as the table that the position approaches $b+1$ for large n.

G: From the above, it may be seen that the number of steps saved is the least when $n = 1$. A pessimistic estimate to the number of "1"s in the minimum may be obtained as $$h(b,n) \approx \frac{b - q(b,n)}{2} + 1,$$

where q is the expected position of the leading "1" in the minimum. This is obtained by assuming that only one number is active after the first iteration and that the "1"s and "0"s are evenly distributed in the remaining $b - q$ bits of the number after detecting the leftmost "1". It is pessimistic because, in general, there will be more than one number left, especially when n is large. In the case where:

$n = 1$, $q(b,n) = 2(1/2^b)$.

$$h(b,1) \approx \frac{b - 2 + \frac{1}{2^b}}{2} + 1 = \frac{b}{2} + \frac{1}{2^{b+1}},$$

Hence
which is close to the actual value $h(b,1) = b/2$. Some accurate values for h will now be derived.

H: $h(b,2) = \frac{b-1}{2} + \frac{1}{2^{b+1}} < h(b,1).$

Proof: Consider a number r. If r is the minimum of two numbers, then the other number can take any of $2^b - r$ values. One of these values is r itself. Since either of the numbers could take the value r, the total number of ways r could be a minimum is $2(2^b - r) - 1$. The number of ways one could choose two numbers is $2^b \cdot 2^b$.

If c(r) is the number of "1"s in the binary representation of r, then:

$$h(b,2) = \sum_{r=0}^{2^b - 1} \frac{c(r)[2(2^b - r) - 1]}{2^{2b}}$$

-continued $$= \frac{1}{2^{2b}} \sum_{r=0}^{2^b-1} (2r+1)[c(2^b - r - 1)].$$

On the other hand:

$$\sum_{r=0}^{2^b-1} rc(2^b - r - 1)$$

$$= b(0) + \sum_{i=0}^{b-1}(b-1)2^i + \sum_{\substack{\text{all} \\ \text{distinct} \\ (i,j) \text{ pairs}}} (b-2)(2^i + 2^j) +$$

$$\sum_{\substack{\text{all} \\ \text{distinct} \\ (i,j,k) \text{ pairs}}} (b-3)(2^i + 2^j + 2^k) + \ldots +$$

$$0(2^0 + 2^1 + \ldots + 2^{b-1})$$

$$= \sum_{i=0}^{b-1} 2^i (b-1)\binom{b-1}{0} + (b-2)\binom{b-1}{1} + \ldots + \binom{b-1}{b-1}$$

$$= (2^b - 1) \sum_{k=1}^{b} (b-k)\binom{b-1}{k-1}$$

$$= (2^b - 1)(b-1) \sum_{k=1}^{b} \frac{b-k}{b-1}\binom{b-1}{b-k}$$

$$= (2^b - 1)(b-1) \sum_{k=1}^{b-1} \frac{b-k}{b-1}\binom{b-1}{b-k}$$

$$= (2^b - 1)(b-1) 2^{b-2},$$

and $$\sum_{r=0}^{2^b-1} c(2^b - r - 1) = \frac{b}{2} \cdot 2^b = b \cdot 2^{b-1}.$$

Therefore, $$h(b,2) = \frac{1}{2^{2b}} [2(2^b - 1)(b-1)2^{b-2} + b \cdot 2^{b-1}]$$

$$= \frac{1}{2^{2b}} [b \cdot 2^{2b-1} - b \cdot 2^{b-1} - 2^{2b-1} + 2^{b-1} + b \cdot 2^{b-1}]$$

$$= \frac{b-1}{2} + \frac{1}{2^{b+1}}.$$

It is seen that the expected number of "1"s in the minimum of two numbers is clearly less than the expected number of "1"s in each of the two random, uniformly distributed numbers.

I: Let $t_1$ and $t_2$ be two b-bit numbers with $c(t_1)$ and $c(t_2)$ the number of "1"s in the binary representation of each number. If $c(t_1) > c(t_2)$, then $p(t_1 > t_2) > \frac{1}{2}$.

Proof: Let $t_1'$ be a number obtained by randomly changing $c(t_1) - c(t_2)$ bits in $t_1$ from "1" to "0". Then $t_1'$ and $t_2$ are two uniformly distributed random numbers with exactly $t_2$ "1"s. Clearly:

$$p(t_1' > t_2) = p(t_1' < t_2) = \frac{1 - p(t_1' = t_2)}{2}.$$

Now, if $t_1' = t_2$, then $t_1$ must be greater than $t_2$. Hence:

$$p(t_1 > t_2) = p(t_1 > t_2 | t_1' \geq t_2) p(t_1' \geq t_2) + p(t_1 > t_2 | t_1' < t_2) p(t_1' < t_2)$$

$$= p(t_1' > t_2) + p(t_1' = t_2) + p(t_1 > t_2 | t_1' < t_2) p(t_1' < t_2)$$

$$= \frac{1 - p(t_1' = t_2)}{2} + p(t_1' = t_2) +$$

$$p(t_1 > t_2 | t_1' < t_2) p(t_1' < t_2) > \frac{1 + p(t_1' = t_2)}{2} > \frac{1}{2}.$$

This indicates that a number having more "1"s than another number is more likely to be larger than the other number. The converse can of course also be shown.

J: Let $t_1$ be two b-bit numbers such that $t_1 > t_2$. Then $p(c(t_1) > c(t_2)) > \frac{1}{2}$.

Proof: By induction. Let $t_1'$ and $t_2'$ be the $b-1$ bit numbers obtained by stripping off the most significant bits $u_1$ and $u_2$ from $t_1$ and $t_2$, respectively. Also let:

$$p(c(t_1) > c(t_2)) = p(c(t_1) > c(t_2) | u_1 > u_2) +$$

$$p(c(t_1) > c(t_2) | u_1 = u_2) =$$

$$p(c(t_1) > c(t_2) | u_1 > u_2) p(u_1 > u_2) +$$

$$p(c(t_1) > c(t_2) | u_1 = u_2) p(u_2 = u_2) =$$

$$p(u_1 > u_2) + p(c(t_1') > c(t_2') | t_1' > t_2') p(u_1 = u_2).$$

By induction, if $p(c(t_1') > c(t_2') | t_1' > t_2') > \frac{1}{2}$, then $p_b > \frac{1}{4} + \frac{1}{2} p_{b-1}$, where $p_b$ is $p(c(t_1) > c(t_2) | t_1 > t_2)$ for b-bit numbers. Since $p_{b-1} > \frac{1}{2}$, and since $p_1 = 1$, it is clear that $p_b > \frac{1}{2}$.

It may be concluded from these results that if a number is larger than another number, it is more likely to have fewer "0"s than the other number. Hence if three numbers $t_1$, $t_2$ and $t_3$ are compared by first comparing $t_1$ and $t_2$, then it is more likely for $t_3$ to be the minimum if $c(t_3) < c(\min(t_1, t_2))$ and it is more likely for $\min(t_1, t_2)$ to be the minimum if $c(t_3) > c(\min(t_1, t_2))$.

This intuitively indicates the expected value of $h(b,n) > h(b, n-1)$.

K: In general, for n numbers:

$$h(b,n) = \sum_{r=0}^{2^b-1} c(r) \left[ \left(\frac{2^b - r}{2^b}\right)^n - \left(\frac{2^b - r - 1}{2^b}\right)^n \right] =$$

$$\sum_{r=1}^{2^b-1} \left(\frac{r}{2^b}\right)^n - \sum_{k=1}^{b} \sum_{r=1}^{2^k-1} \left(\frac{r}{2^k}\right)^n.$$

Proof:
As before, $$h(b,n) = \sum_{r=0}^{2^b-1} c(r) \left[ \frac{(2^b - r)^n - (2^b - r - 1)^n}{2^{nb}} \right]$$

$$= \sum_{r=0}^{2^b-1} c(2^b - r - 1) \left[ \left(\frac{r+1}{2^b}\right)^n - \left(\frac{r}{2^b}\right)^n \right]$$

$$= \sum_{r=0}^{2^b-1} [c(2^b - r) - c(2^b - r - 1)] \left(\frac{r}{2^b}\right)^n.$$

-continued

Now $c(2^b-r)-c(2^b-r-1) =$ 1 for all $r$ ending in 1
0 for all $r$ ending in 10
−1 for all $r$ ending in 100
−2 for all $r$ ending in 1000
... etc.

This may be rewritten as:

$$h(b,n) = \sum_{r=0}^{2^b-1}\left(\frac{r}{2^b}\right)^n - \sum_{r=0}^{2^b-1-1}\left(\frac{r}{2^{b-1}}\right)^n -$$

$$\sum_{r=0}^{2^{b-2}-1}\left(\frac{r}{2^{b-2}}\right)^n - \ldots - \sum_{r=1}^{2^0-1}\left(\frac{r}{2^0}\right)^n = \sum_{r=0}^{2^b-1}\left(\frac{r}{2^b}\right)^n -$$

$$\sum_{k=0}^{b-1}\sum_{r=0}^{2^k-1}\left(\frac{r}{2^k}\right)^n.$$

L: (i) To show that h(b,n) is a monotonically decreasing function of n (n≧0) for a fixed value of b, it suffices to show that:

$$h'(b,n) = 2^{-bn}\sum_{r=0}^{2^b-1}\left(\left(r+\frac{1}{2}\right)^n - r^n\right)$$

is a monotonically decreasing function. For this, it in turn suffices to show that:

$D(i,n) = (2i-1) - (2i-2)\cdot 2^n + (2i-3)\cdot 3^n - \ldots + $ (ii)

$1\cdot(2r-1)^n > 0$ for $r \geq 1, n \geq 0$.

Since $f(b,n) = 2^{-(b+1)}(1^n - 2^n + 3^n - \ldots + (2^{b+1}-1)^n)$, $f(b,n) - f(b,n+1) = 2^{-(b+1)(n+1)}((2^{b+1}-1) -$ $(2^{b+1}-2)2^n + (2^{b+1}-3)3^n - \ldots + 1\cdot(2^{b+1}-1)^n) =$ $2^{-(b+1)(n+1)}(D(2^b, n)) > 0$, by (ii).

To show (ii), it suffices to show that:

$E(i,n) = 2 - 2\cdot 2^n + 2\cdot 3^n - \ldots - 2\cdot(2i)^n + (2i+1)^n$ (iii)

$E(i,n) \geq 0$, for $i \geq 0, n \geq 0$.

Since $D(1,n) = 1 > 0$, $D(i+1,n) - D(i,n) = E(i,n) \geq 0$, by (iii).

But, $E(0,n) = 1$, and $E(i+1,n) - E(i,n) = (2i+3)^n - 2(2i+2)^n + (2i+1)^n \geq 0$, since $X^n$ is a convex function.

Hence, (iii) is shown, thus proving h(b,n) is a monotically decreasing function of n.

We claim:

1. A method for determining a minimum/maximum among a plurality of data words, comprising the steps of:
   (a) storing each of said data words in a corresponding processing element;
   (b) outputting from each of said processing elements a first multi-bit signal having a predetermined bit state only in a position corresponding to the position of the highest order non-zero bit of the data word stored in the processing element;
   (c) eliminating from said second multi-bit signal said predetermined bit state in all positions except for a lowest order position in said predetermined bit state to provide a third multi-bit signal;
   (e) deactivating ones of said processing elements having a data word having a non-zero bit in a higher position than said lowest order position in said third multi-bit signal;
   (f) in each processing element not deactivated, eliminating any non-zero bit from said data word in the same position as said lowest order position in said third multi-bit signal; and
   (g) repeating, with respect to each processing element not deactivated, said steps (b) to (f) until only a single processing element or plural processing elements in which are stored the same data word remain active.

2. The method for determining a minimum/maximum of claim 1, wherein said step (a) of storing each of said data words comprises storing each of said data words in an uncomplemented form, whereby said method is a method for determining a minimum.

3. The method for determining a minimum/maximum of claim 1, wherein said step (a) of storing each of said data words comprises storing each of said data words in complemented form, whereby said method is a method for determining a maximum.

4. The method for determining a minimum/maximum of claim 1,
   wherein, in said step (b) of outputting from each of said processing element a first multi-bit signal, said predetermined bit state is a logical "0"; and
   wherein said step (c) of assembling said second multi-bit signal comprises determining a bit-by-bit low-truth OR function of each said first multi-bit signals from each of said processing elements.

5. The method for determining a minimum/maximum of claim 4, wherein said step (c) of assembling said second multi-bit signal comprises applying each said first multi-bit signals from each of said processing elements to an open-collector bus.

6. The method for determining a minimum/maximum of claim 1, further comprising the step of:
   (h) assembling a value having a "1" in positions corresponding to said lowest order position in said third multi-bit signal for each repetition of said step (d).

7. The method for determining a minimum/maximum of claim 6, further comprising the steps of:
   (i) in each of said processing elements not deactivated, determining whether the result of said step (f) is an all-zeros signal; and
   (j) if in said step (i) it is determined that said result of said step (f) is an all-zeros signal, producing an indication that a minimum/maximum has been determined.

8. The method for determining a minimum/maximum of claim 1, wherein said step (e) of deactivating ones of said processing elements comprises the steps of:
   in each said processing element, comparing said first multi-bit signal with said third multi-bit signal; and
   inhibiting the processing element from outputting its first multi-bit signal unless said first and third multi-bit signals are the same.

9. A method for determining a minimum/maximum among a plurality of data words, comprising the steps of:
   (a) storing each of said data words in a corresponding processing element;

(b) in each of said processing elements, producing a first multi-bit signal having a "1" bit of the data word stored in the processing element;

(c) in each of said processing elements, complementing said first multi-bit signal;

(d) in each of said processing elements, outputting the complemented first multi-bit signal onto an open-collector bus to provide a second multi-bit signal;

(e) complementing said second multi-bit signal from said bus;

(f) storing the complemented second multi-bit signal;

(g) providing a third multi-bit signal having a "1" only in a bit position corresponding to the position of the lowest order "1" bit of the stored complemented second multi-bit signal;

(h) eliminating ones of said processing elements having a data word having a "1" bit in a bit position higher than the position of said "1" bit in said third multi-bit signal;

(i) in each of said processing elements not deactivated, eliminating any "1" bit from the data word stored therein in the same bit position as said "1" bit in said third multi-bit signal; and (j) repeating, with respect to each of said processing elements not deactivated, said steps (b) to (i) until one of said processing elements which is not deactivated produces an all-zeros value as a result of said step (i).

10. The method for determining a minimum/maximum of claim 9, wherein step (a) of storing each of said data words comprises storing each of said data words in uncomplemented form, whereby said method is a method for determining a minimum.

11. The method for determining a minimum/maximum of claim 9, wherein said step (a) of storing each of said data words comprises storing each of said data words in complemented form, whereby said method is a method for determining a maximum.

12. The method for determining a minimum/maximum of claim 9, wherein said step (h) of eliminating ones of said processing elements comprises:
in each of said processing elements, comparing said first multi-bit signal and said third multi-bit signal; and
inhibiting the processing element from outputting its multi-bit signal onto said open-collector bus unless said first and third multi-bit signals are the same.

13. The method for determining a minimum/maximum of claim 9, further comprising the step of:
(k) assembling a value having a "1" in positions corresponding to said lowest order position in said third multi-bit signal for each repetition of said step (h).

14. An apparatus for determining a minimum/maximum among a plurality of data words, comprising:
A. a plurality of processing elements, each of said processing elements comprising:
(1) means for for storing a respective one of said data words;
(2) means for producing a first multi-bit signal having a "1" bit in a position corresponding to the position of a highest "1" bit in the data word stored in the processing element;
(3) means for eliminating from said data word a "1" bit in the same position as a "1" bit in a control signal; and
(4) means for comparing said control signal with said multi-bit signal and deactivating the processing element unless said control signal and said multi-bit signal are the same;
B. means for providing a second multi-bit signal as a bit-by-bit logical OR of said first multi-bit signals from ones of said processing elements which are not deactivated; and
C. controller means comprising means for producing said control signal by eliminating all but a lowest order "1" bit from said second multi-bit signal.

15. The apparatus for determining a minimum/maximum of claim 14, wherein said means for providing said second multi-bit signal comprises:
in each of said processing elements, means for complementing said first multi-bit signal;
an open-collector bus receiving the outputs of said complementing means from each of said processing elements; and
in said controller means, means for complementing the signal on said open-collector bus.

16. The apparatus for determining a minimum/maximum of claim 15, wherein said controller means further comprises means for transmitting said control signal to said processing elements through said open-collector bus.

17. The apparatus for determining a minimum/maximum of claim 14, wherein said controller means further comprises means for assembling and storing a value having "1" bits in positions corresponding to "1" bits of said control signal for each state of said control signal.

18. The apparatus for determining a minimum/maximum of claim 14, wherein said controller means further comprises means for activating, in sequence, said means for producing said multi-bit signal, said means for eliminating, said means for comparing, and said means for producing said control signal.

19. An apparatus for determining a minimum/maximum among a plurality of data words, comprising:
A. an open-collector bus including a plurality of data lines and a completion signal line;
B. a plurality of processing elements, each of said processing elements comprising:
(1) a first bus transceiver having a bus port coupled to said open-collector bus;
(2) a first register for storing data from a data output port of said bus transceiver;
(3) a second register for storing a respective one of said data words;
(4) an S-R latch register;
(5) first gating means for loading a value stored in said second register into said S-R latch register through S inputs of said S-R latch register at the beginning of a minimum/maximum determination procedure;
(6) second gating means for inputting to said S-R latch register through R inputs thereof an output value from said first register;
(7) leading one detector means having an input port coupled to an output port of said S-R latch register and an output port coupled to a data input port of said first bus transceiver;
(8) comparator means for producing an output signal in an active state when values present on first and second input ports thereof are unequal, said first input port of said comparing means being coupled to said outputs of said first register and said second input port of said comparing means being coupled to said output port of said leading one detector;

(9) a latch for storing said output of said comparing means;

(10) third gating means for controlling a transmit-/receive state of said first bus transceiver in accordance an output of said latch; and

(11) open-collector logical OR means having inputs coupled to said output port of said leading one detector and an output coupled to said completion signal line; and C. a controller comprising:

(1) a second bus transceiver having a bus port coupled to said open-collector bus;

(2) a fourth register for storing a data value from a data output port of said second bus transceiver;

(3) trailing one detector means having input port coupled to an output port of said fourth register, an output port of said trailing one detector being coupled to a data input port of said bus transceiver; and (4) a control unit for generating control signals for sequentially activating said first and second bus transceivers, said first, second, S-R latch and fourth registers, said first through third gating means, and said latch.

20. The apparatus for determining a minimum/maximum of claim 19, wherein said control unit comprises:

a continuously cycling counter for generating said control signals; and means for inhibiting said counter in response to an active state being present on said completion signal line.

21. The apparatus for determining a minimum/maximum of claim 19, wherein said first and second bus transceivers comprise means for complementing signal values passed between said bus port and said data output port and between said data input port and said bus port.

* * * * *